(12) United States Patent
Horimai et al.

(10) Patent No.: US 7,428,206 B2
(45) Date of Patent: Sep. 23, 2008

(54) HOLOGRAPHIC INFORMATION RECORDING APPARATUS

(75) Inventors: Hideyoshi Horimai, Kanagawa (JP); Yoshio Aoki, Kanagawa (JP)

(73) Assignee: Optware Corporation, Kanagawa (JP)

( * ) Notice: Subject to any disclaimer, the term of this patent is extended or adjusted under 35 U.S.C. 154(b) by 513 days.

(21) Appl. No.: 10/886,282

(22) Filed: Jul. 7, 2004

(65) Prior Publication Data
US 2005/0007930 A1 Jan. 13, 2005

(30) Foreign Application Priority Data
Jul. 8, 2003 (JP) .............................. 2003-193965

(51) Int. Cl.
*G11B 7/0065* (2006.01)
(52) U.S. Cl. ..................................... 369/103
(58) Field of Classification Search ................. 369/103
See application file for complete search history.

(56) References Cited

U.S. PATENT DOCUMENTS

| | | | | |
|---|---|---|---|---|
| 3,716,286 A | * | 2/1973 | St. John et al. ................. | 359/3 |
| 4,104,489 A | * | 8/1978 | Satoh et al. .................. | 369/103 |
| 5,319,629 A | * | 6/1994 | Henshaw et al. ............ | 369/103 |
| 5,426,521 A | * | 6/1995 | Chen et al. ...................... | 359/9 |
| 7,236,442 B2 | * | 6/2007 | Sugiki et al. ................. | 369/103 |
| 2005/0083799 A1 | * | 4/2005 | Horimai .................. | 369/44.28 |
| 2006/0050544 A1 | * | 3/2006 | Horimai ........................ | 365/6 |

* cited by examiner

Primary Examiner—Andrea Wellington
Assistant Examiner—Michael V Battaglia
(74) Attorney, Agent, or Firm—William L. Androlia; H. Henry Koda

(57) ABSTRACT

It is an object of the invention to improve a recording capacity density by removing part of diffracted light and by making a recording region in relation to a recording medium in the efficient shape. An optical information recording apparatus in which holography is formed in an optical information recording medium by making information light reflected by a spatial modulator interfere with reference light, is provided with a diffracted light removal means which removes part of diffracted light of the reflected light, and whose aperture is in the shape of a square.

3 Claims, 9 Drawing Sheets

(a) ON (b) OFF

HOLOGRAPHIC INFORMATION RECORDING APPARATUS

BACKGROUND OF THE INVENTION

1. Field of the Invention

The present invention relates to an optical information recording apparatus which can appropriately process diffracted light of reflected light from a DMD(DIGITAL MICRO MIRROR DEVICE) when the DMD™ is used as a spatial light modulator.

2. Description of the Related Art

In general, holographic recording which records information in a recording medium by utilizing holography is performed by overlapping information light carrying image information and reference light inside the recording medium and writing resultant interference fringes in the recording medium. When the recorded information is reproduced, the recording medium is illuminated with reference light to cause diffraction attributable to the interference fringes which reproduces the image information.

In order to generate the information light carrying the image information, light is spatially modulated by optical intensity. For example, in Japanese Unexamined Patent Application Publication No. H11-311938, there are descriptions regarding the holographic recording and light modulation. According to this Japanese Unexamined Patent Application Publication No. H11-311938, descriptions are given that a liquid crystal device can be used for the light modulation.

Here, as a device to spatially modulate light, it is thinkable to use a DMD™. This DMD™ can reflect incident light, changing reflection directions thereof every pixel.

The DMD™ is, however, an aggregation of fine mirrors having a cycle structure. Therefore, the DMD™ forms kind of a diffraction grating. Therefore, redundant diffracted light also exits from the DMD™. When such redundant diffracted light is used as information light, holography required for recording information becomes too large, and a recording capacity of the recording medium becomes decreased. Shutting out the diffracted light prevents the holography from becoming too large. In this case, however, since light is shut out, the information light becomes dark, and efficiency to utilize the information light becomes low.

As above, when the DMD™ is used as a device to spatially modulate light, there is a problem that the diffracted light of reflected light is hard to be processed.

In order to resolve the foregoing problem, it is thinkable that part of the diffracted light of the reflected light is removed by providing a diffracted light removal means such as a diaphragm in the middle of the information light.

SUMMARY OF THE INVENTION

In view of the foregoing problems, it is an object of the invention to provide an optical information recording apparatus which can improve a recording capacity density by utilizing a DMD™ as a spatial modulator and removing part of diffracted light of reflected light from the DMD™ and by forming recording regions in relation to a recording medium in the efficient shape; and further, which can record information carrying a high information amount by maintaining an amount of information light to be recorded at a high level.

In order to attain the foregoing object, the optical information recording apparatus of the invention is an optical information recording apparatus in which holography is formed in an optical information recording medium by making information light reflected by a spatial modulator interfere with reference light, wherein a diffracted light removal means which removes part of diffracted light of the reflected light, and whose aperture is in the shape of a square is provided.

By forming the optical information recording apparatus as above, a shape of the recording region recorded in the optical information recording medium becomes approximately square. Therefore, when recording is performed by sequentially shifting each recording region, there becomes no vacant space between adjacent recording regions, so that the recording regions in relation to the recording medium become efficient with no waste. Further, compared to a circular aperture inscribed in the square aperture, diffracted light having a large diffraction dimension can be utilized as information light. Therefore, information recording in which utilization efficiency of the information light is maintained at a high level can be performed. Consequently, the recording density of information can be significantly improved.

DETAILED DESCRIPTION OF THE PREFERRED EMBODIMENT

Descriptions will be hereinafter given of an embodiment of the invention with reference to the drawings.

Figure 1:
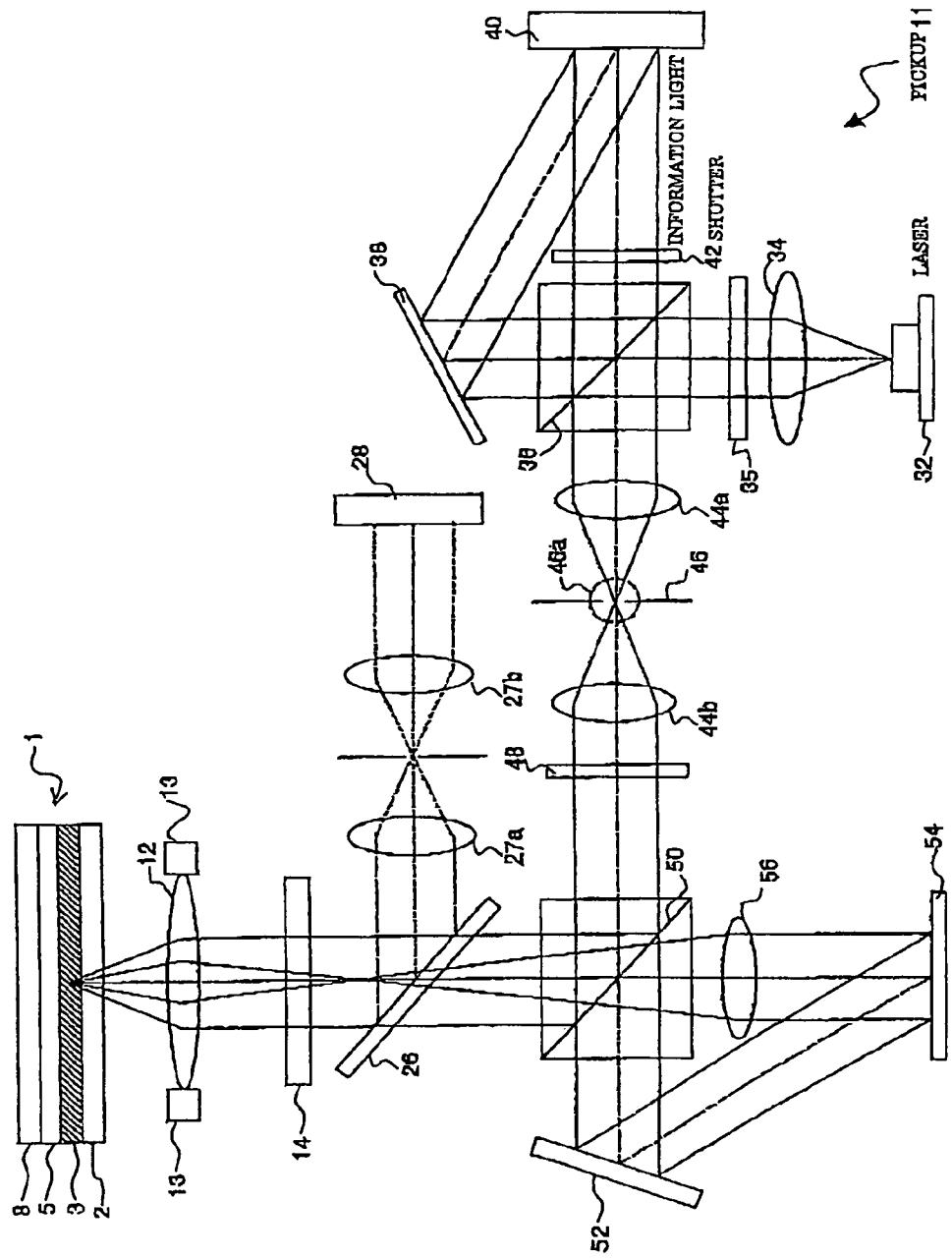
FIG. 1 is an explanation drawing showing a construction of an optical information recording/reproducing apparatus according to an embodiment of the invention.

FIG. 1 is an explanation drawing showing a construction of an optical information recording/reproducing apparatus according to the embodiment of the invention. FIG. 1 shows the optical information recording/reproducing apparatus as well. In the embodiment of the invention, a plate-shaped optical disk is used as an optical information recording medium. A card-shaped recording medium, however, can be also used. Further, the optical information recording/reproducing apparatus has a pickup 11.

Construction of the Optical Information Recording Medium

First, with reference to FIG. 1, a construction of the optical information recording medium in the embodiment of the invention will be described. In this optical information recording medium 1, a hologram recording layer 3 as an information recording layer in which information is recorded by utilizing volume holography, a reflection film 5, and a substrate (protection layer) 8 are layered in this order over a plate-shaped transparent substrate 2 made of polycarbonate and the like.

The hologram recording layer 3 is made of a hologram material whose optical characteristics such as refraction factor, dielectric constant, and reflectance are changed corresponding to optical intensity when illuminated with light. As a hologram material, for example, Photopolymers HRF-600 (product name) of Dupont, make or the like is used.

The reflection film 5 is a film to reflect light (reference light for reproduction and the like). The reflection film 5 is, for example, made of aluminum.

The substrate (protection layer) 8 is, for example, a substrate with address, which is formed by injection. The substrate (protection layer) 8 is provided with an unshown address servo area and an unshown data area. Servo control of illumination positions of light to the optical information recording medium 1 can be performed by using the address servo area. Information to be recorded in the optical information recording medium 1 can be written in the data area in the form of holography.

Construction of the Pickup

The pickup 11 is intended to illuminate the optical information recording medium 1 with reference light and information light, and receive reproduction light from the optical information recording medium 1. The pickup 11 comprises an objective lens 12, actuators 13, a one fourth wavelength plate 14, a half mirror 26, lenses 27a and 27b, a photodetector 28, a laser light source 32, a collimator lens 34, a one half wavelength plate 35, a polarizing beam splitter 36, a mirror 38, a spatial light modulator (information expressive means) 40, a shutter 42, lenses 44a and 44b, a diaphragm 46 as a diffracted light removal means, a one half wavelength plate 48, a half mirror 50, a mirror 52, a mirror 54, and a lens 56.

Figure 8:
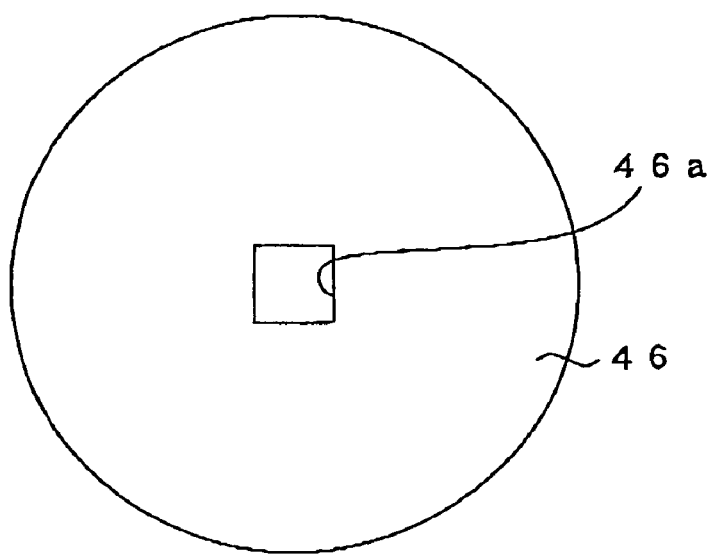
FIG. 8 is a drawing showing a construction of the diaphragm 46.

As shown in FIG. 8, an aperture 46a of this diaphragm 46 is formed in the shape of a square.

The information light means light which carries information desired to be recorded. In FIG. 1, the information light is formed by modulating laser light generated at the laser light source 32 by the spatial light modulator 40. The optical information recording medium 1 is illuminated with the information light. The reference light includes reference light for recording to form the holography by making the reference light for recording interfere with the information light; and the reference light for reproduction to reproduce information from the holography. Further, the reproduction light means light which returns from the optical information recording medium 1 to the pickup 11 when the reference light for reproduction enters the optical information recording medium 1. The reproduction light carries information reproduced from the optical information recording medium 1.

The objective lens 12 is placed on the side of the transparent substrate 2 of the optical information recording medium 1. The reference light and the information light pass through the objective lens 12, and enter the optical information recording medium 1. The reproduction light from the optical information recording medium 1 passes through the objective lens 12, and proceeds toward the half mirror 26.

The actuator 13 is intended to move the objective lens 12 in the thickness direction and the radius direction of the optical information recording medium 1.

When linearly polarized light such as P polarized light and S polarized light enters the one fourth wavelength plate 14, and an angle made between a direction of the linearly polarized light and an optical axis of a crystal in the one fourth wavelength plate 14 is 45° the one fourth wavelength plate 14 changes the passing light from the linearly polarized light to circularly polarized light. The information light is the P polarized light, which becomes the circularly polarized light after passing the one fourth wavelength plate 14 to enter the optical information recording medium 1. The reproduction light is the circularly polarized light, which becomes the S polarized light after passing the one fourth wavelength plate 14 to reach the photodetector 28 through the lenses 27a and 27b.

The half mirror 26 lets through the information light and forwards the information light toward the one fourth wavelength plate 14. The half mirror 26 reflects the reproduction light, and forwards the reflected reproduction light toward the lenses 27a and 27b. The lenses 27a and 27b receive the reproduction light from the half mirror 26, and makes the received reproduction light enter the photodetector 28. The photodetector 28 receives and detects the reproduction light. Information recorded in the optical information recording medium 1 can be thereby reproduced.

The laser light source 32 generates laser light. This laser light becomes a basis of the information light and the reference light. The collimator lens 34 receives the laser light from the laser light source 32, and makes the laser light parallel light rays. The one half wavelength plate 35 receives the parallel light rays from the collimator lens 34, and makes the parallel light rays the P polarized light and the S polarized light. The polarizing beam splitter 36 receives the P polarized light and the S polarized light from the one half wavelength plate 35, lets through the P polarized light, and reflects the S polarized light. The passing P polarized light proceeds toward the mirror 38, and the reflected S polarized light proceeds toward the lens 44a. This P polarized light becomes a base of the information light, and this S polarized light becomes a basis of the reference light. The mirror 38 receives the P polarized light, and reflects the P polarized light toward the spatial light modulator 40.

Figure 2:
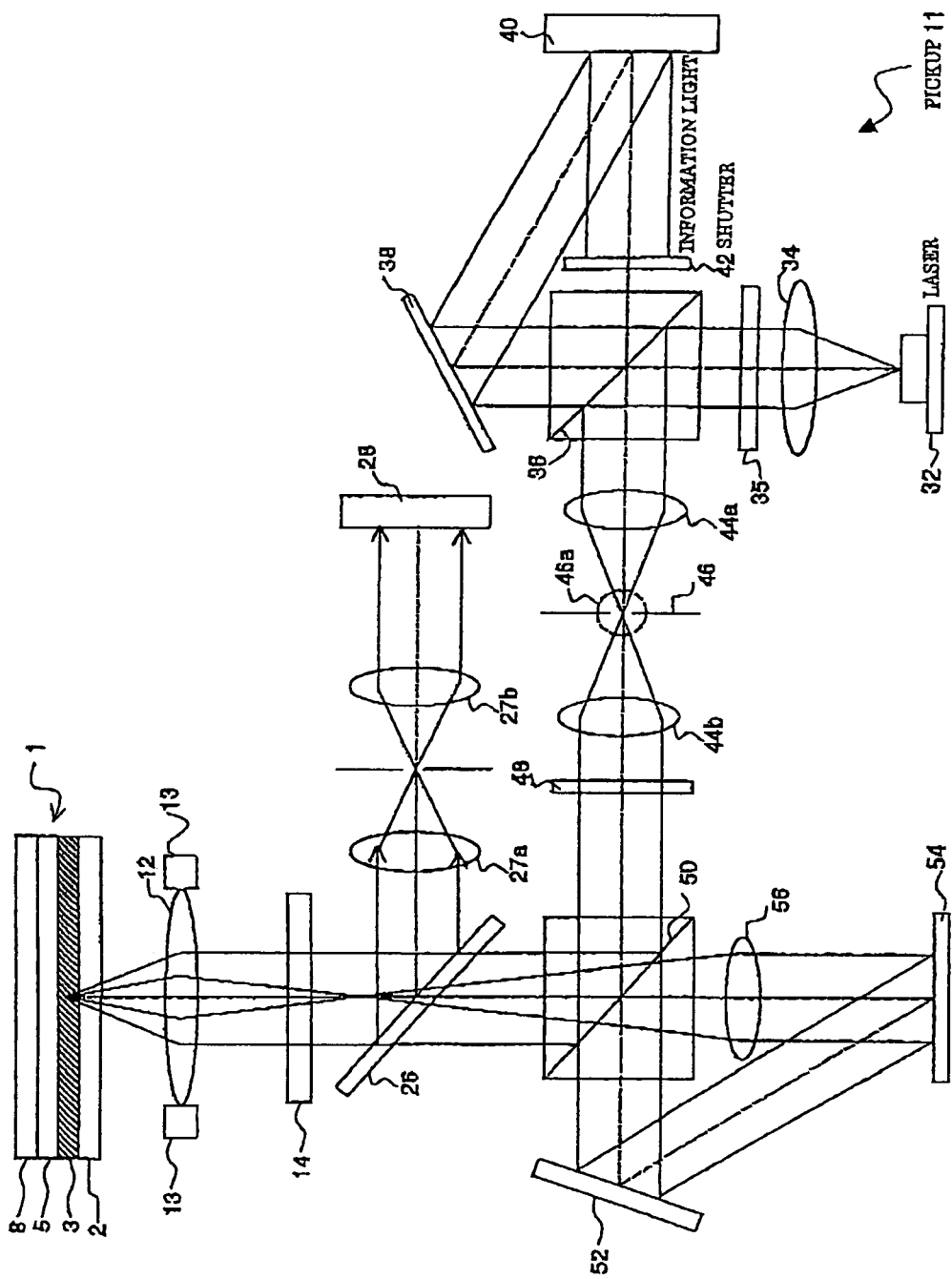
FIG. 2 is an explanation drawing showing operation of the optical information recording/reproducing apparatus when information is reproduced from an optical information recording medium 1.
Figure 9:
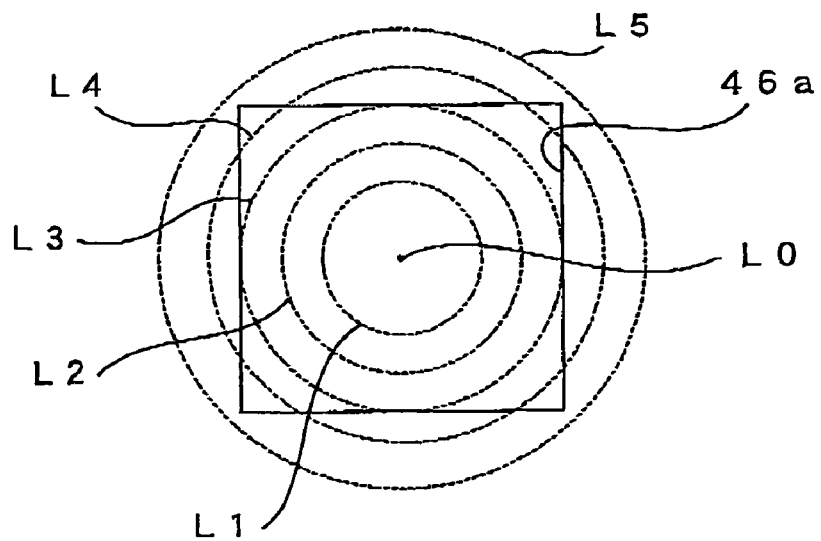
FIG. 9 is a drawing showing a relation between an aperture 46a of the diaphragm 46 and passing information light.

The spatial light modulator (information expressive means) 40 generates the information light by receiving the P polarized light from the mirror 38 and reflecting the P polarized light. The generated information light passes through the shutter 42 and the polarizing beam splitter 36, and proceeds towards the lens 44a. For the spatial light modulator 40, the DMD™ is used. Therefore, not only the information light, but also the diffracted light of the reflected light exits from the spatial light modulator 40. The DMD™ can express information based on reflection directions of incident light. That is, the incident light can be spatially modulated. The shutter 42 is open when information is recorded in the optical information recording medium 1, and closed when information is reproduced from the optical information recording medium 1 (refer to FIG. 2). The lens 44a receives the diffracted light (information light) from the spatial optical modulator 40, and forms an image on the diaphragm 46. Then, as shown in FIG. 9, light close to an optical axis (L0) among the diffracted light (information light) and the diffracted light passes through the aperture 46a of the diaphragm 46. Meanwhile, light far from the optical axis (L5) and light whose distance from the optical axis is farther than of L5 among the diffracted light cannot pass through the diaphragm 46. Respective distances have the following relation: a distance between the lens 44a and the diaphragm 46=a distance between the lens 44b and the diaphragm 46=a distance between the spatial optical modulator 40 and the lens 44a=a distance between the lens 44b and the mirror 52=f=a focal distance. The one half wavelength plate 48 changes the S polarized light reflected by the polarizing beam splitter 36 to the P polarized light, which becomes the reference light.

The half mirror 50 reflects the information light, and forwards the reflected information light toward the half mirror 26. In addition, the half mirror 50 lets through the reference light, and forwards the reference light toward the mirror 52. The mirror 52 reflects the reference light toward the mirror 54, which faces the optical information recording medium 1. The mirror 54 reflects the reference light, and forwards the reflected reference light toward the lens 56. The lens 56 refracts the reference light so that its focal point can be placed before the optical information recording medium 1.

When operation information of recording and reproduction of optical information is recorded in the optical information recording medium 1, laser light generated by the laser light source 32 passes through the collimator lens 34, the one half wavelength plate 35, and the polarizing beam splitter 36, is reflected by the mirror 38, and proceeds toward the spatial light modulator 40. Then, the laser light is changed to information light by the spatial light modulator 40. The information light passes the shutter 42, the polarizing beam splitter 36, the lens 44a, the diaphragm 46, the lens 44b, and the one half wavelength plate 48. Subsequently, the information light is reflected by the half mirror 50, passes through the one fourth wavelength plate 14, and proceeds toward the objective lens 12. The optical devices from the spatial light modulator 40 to the objective lens 12 (the lens 44a, the diaphragm 46, the lens 44b, the one half wavelength plate 48, the one half mirror 50 and the like) correspond to an information light acquisition means to acquire the information light from the spatial light modulator 40.

Meanwhile, laser light generated by the laser light source 32 passes through the collimator lens 34, the one half wavelength plate 35, and is reflected by the polarizing beam splitter 36 to become the reference light for recording. The reference light for recording passes the lens 44a, the diaphragm 46, the lens 44b, the one half wavelength plate 48, and the half mirror 50, is reflected by the mirrors 52 and 54, and proceeds toward the objective lens 12 while being refracted by the lens 56.

The objective lens (holography forming method) 12 makes the information light interfere with the reference light for recording in the hologram recording layer 3 of the optical information recording medium 1 to form the holography.

A characteristic part of the embodiment of the invention lies in structures of the spatial light modulator (information expressive means) 40, the lenses 44a, 44b, and the diaphragm 46. Descriptions will be hereinafter given of the spatial light modulator 40, the lenses 44a, 44b, and the diaphragm 46.

Figure 3:
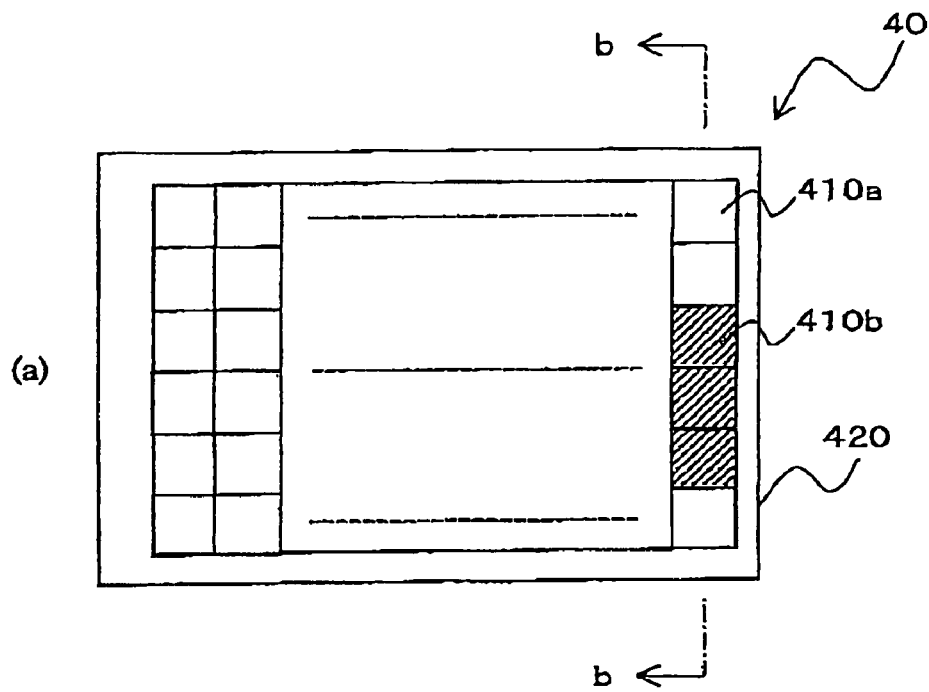
FIG. 3a is a plane view of a spatial light modulator 40.
FIG. 3b is a cross sectional view of the spatial light modulator 40.
Figure 3:
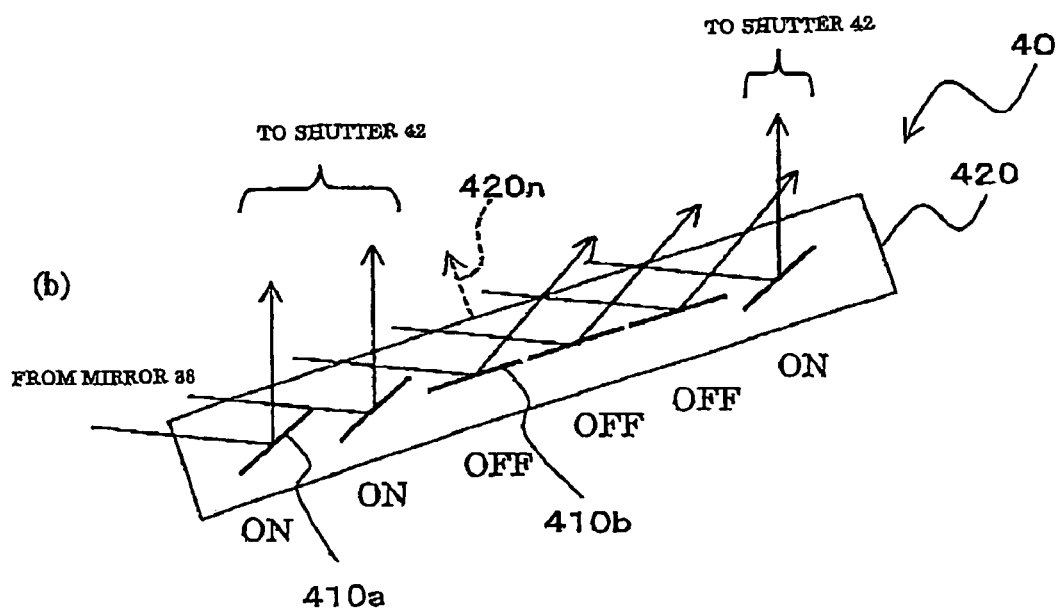

FIG. 3a is a plane view of the spatial light modulator 40, and FIG. 3b is a cross sectional view of the spatial light modulator 40. The spatial light modulator 40 is the DMD™. The spatial light modulator 40 has a fine mirror 410 which reflects incident light from the mirror 38 and a die 420 which supports the mirror 410. When seeing the spatial light modulator 40 from the shutter 42 side with reference to FIG. 3a, the mirror 410 is divided into a group of luminous mirrors 410a and a group of nonluminous mirrors 410b. These two groups have different angles from each other in relation to the incident light. As shown in FIG. 3b, the luminous mirror 410a tilts so that the reflected light can proceed immediately above thereof (in the direction of the shutter 42). Meanwhile, a tilt angle of the nonluminous mirror 410b is set so as to prevent the reflected light from proceeding immediately above thereof. Here, when the luminous mirror 410a is assigned to ON (or :1"), and the nonluminous mirror 410b is assigned to OFF (or"0"), it is possible that the reflected light of the spatial light modulator 40 can carry information of one bit every mirror 410. The laser light from the laser light source 32 thereby can be spatially modulated. A direction of a normal line 420n of the die 420 is different from the proceeding direction of the reflected light of the luminous mirror 410a (in the direction of the shutter 42). This difference between the two directions is defined so that the proceeding direction of the reflected light of the luminous mirror 410a and a proceeding direction of a part of diffracted light of this reflected light (for example—11th element) can correspond with each other.

Figure 4:
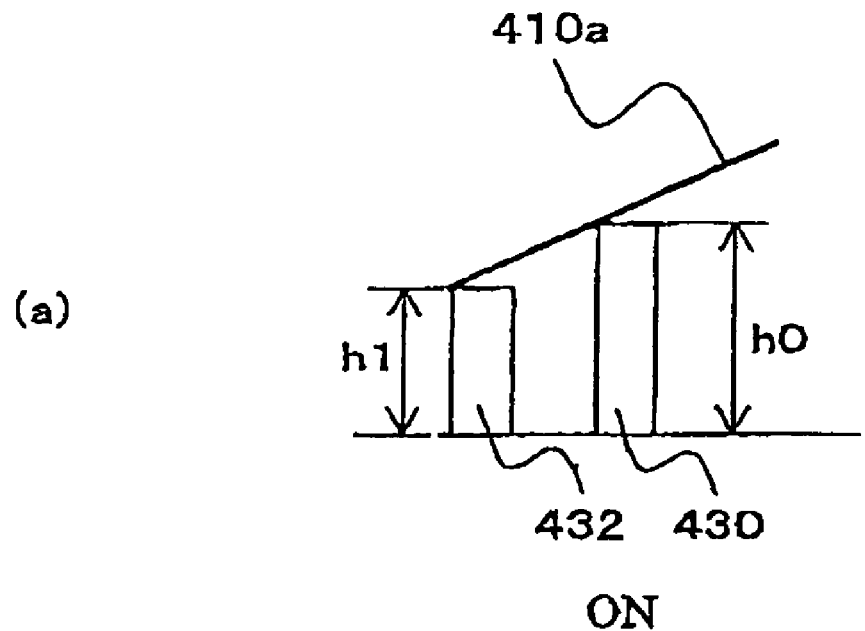
FIGS. 4a and 4b are drawings showing a mechanism to decide tilt angles of a mirror 410.
Figure 4:
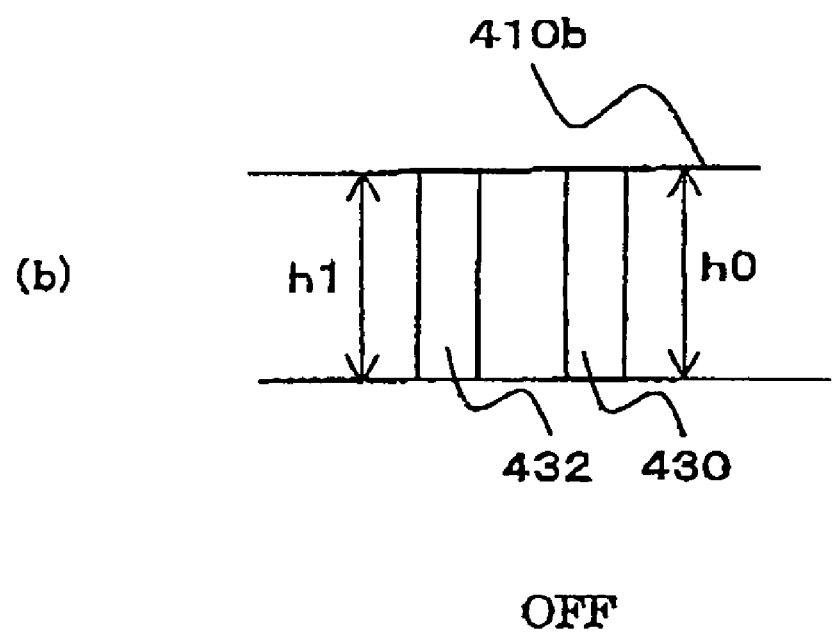

FIGS. 4a and 4b are drawings showing a mechanism to decide tilt angles of the mirror 410. A central part of the mirror 410 is supported by a central pillar 430 (height:h0), and a left end thereof is supported by a left side pillar 432 (height:h1). When ON is expressed, the left side pillar 432 is set to be lower (h1<h0) to tilt the mirror 410 to the left side. Meanwhile, when OFF is expressed, the left side pillar 432 is set to be as high as the central pillar 430 (h1=h0) to even up the mirror 410. It is possible, however, that the left side pillar 432 is set to be higher than the central pillar 430 (h1>0), and the mirror 410 is tilted to the right side.

Figure 5:
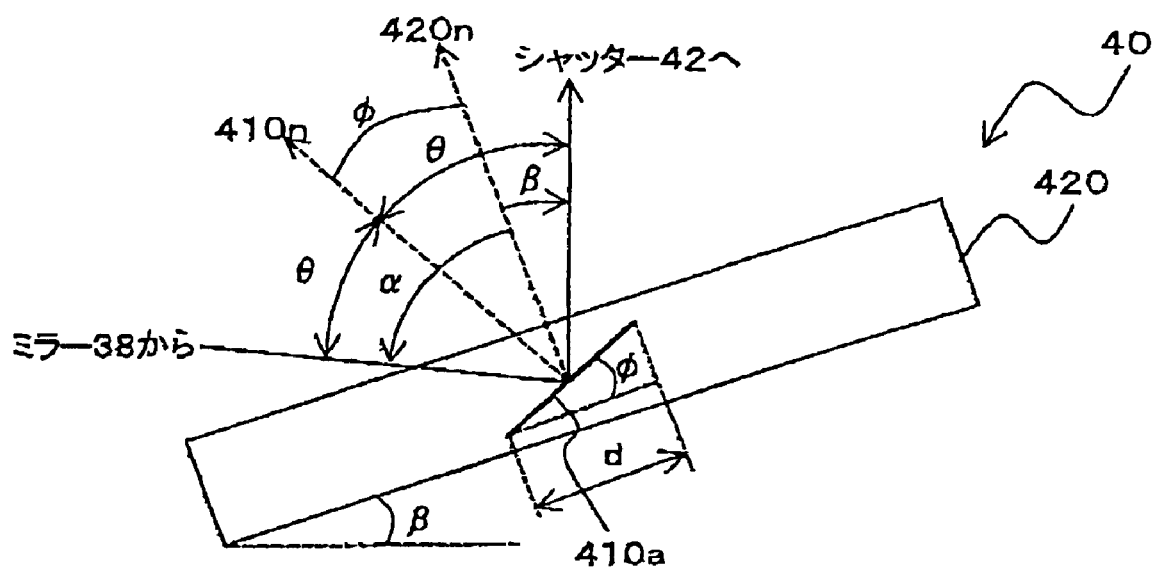
FIG. 5 is a drawing to explain a method to decide a tilt angle of the mirror 410 and a direction of a normal line 420n of a die 420.
Figure 6:
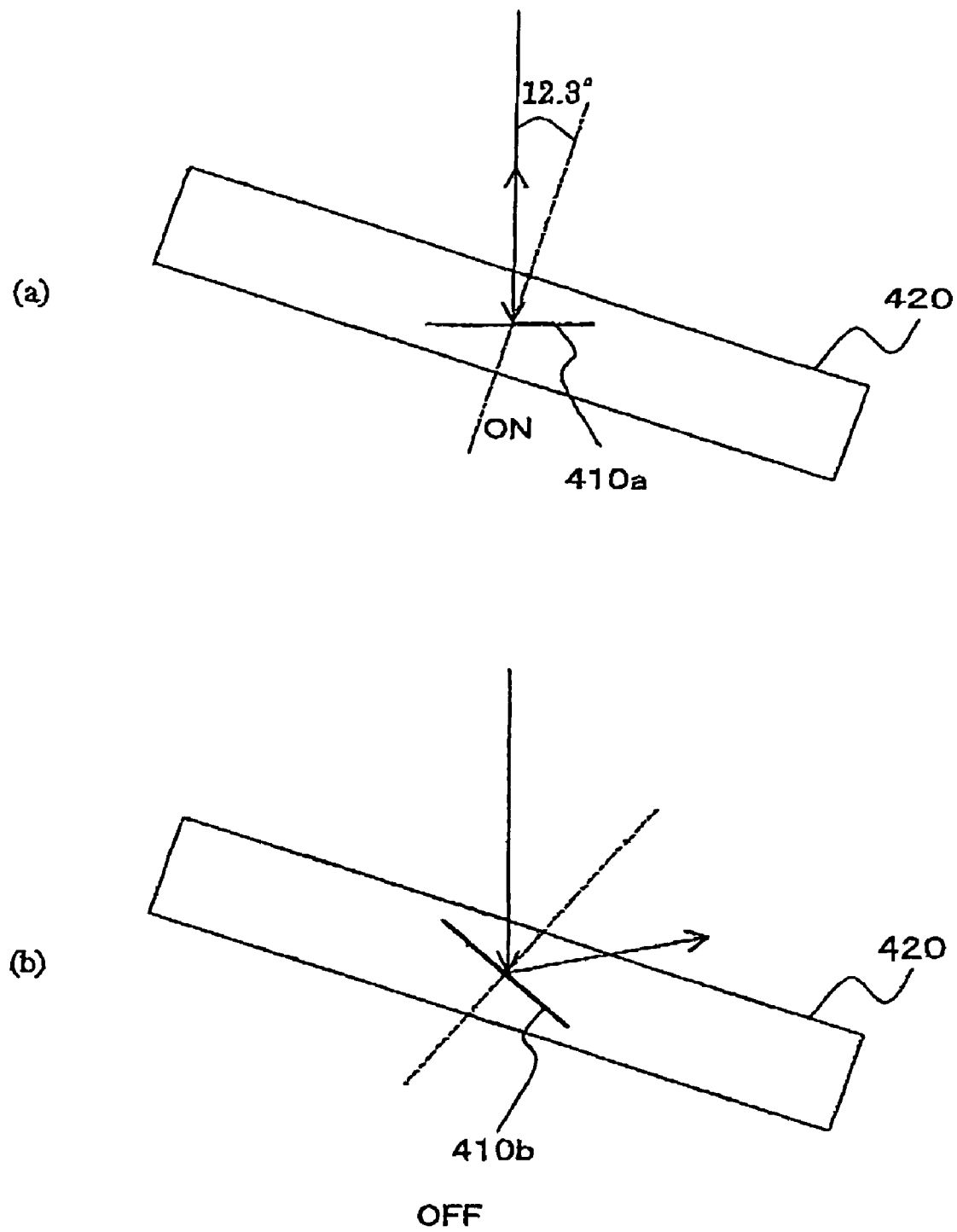
FIG. 6a shows a position of a luminous mirror 410a, and FIG. 6b shows a position of a nonluminous mirror 410b.

FIG. 5 is a drawing to explain a method to decide the tilt angle of the mirror 410 and the direction of the normal line 420n of the die 420.

The luminous mirror 410a tilts at an angle of $\phi$ in relation to the die 420. Then, an angle made between the normal line 420n of the die 420 and a normal line 410n of the luminous mirror 410a is also $\phi$. Further, an angle made between incident light from the mirror 38 and the normal line 410n is set to be $\theta$. Then, an angle made between reflected light toward the shutter 42 and the normal line 410n is also $\theta$ $\theta$. Here, an angle made between the incident light from the mirror 38 and the normal line 420n is set to be $\alpha$, and an angle made between the reflected light toward the shutter 42 and the normal line 420n is set to be $\beta$. In result, the angle made between the reflected light toward the shutter 42 and the normal line 420n becomes $\beta$.

Here, as described above, $\phi$ and the like have to be defined so that the proceeding direction of the reflected light of the luminous mirror 410a and the proceeding direction of part of the diffracted light of this reflected light (for example, −11th element) can correspond with each other. If defined so, intensity of the reflected light passing in the vicinity of the optical axis can be increased, and a rate (utilization efficiency) of laser light capable of being utilized as information light per the laser light generated by the laser light source 32 can be increased.

Figure 7:
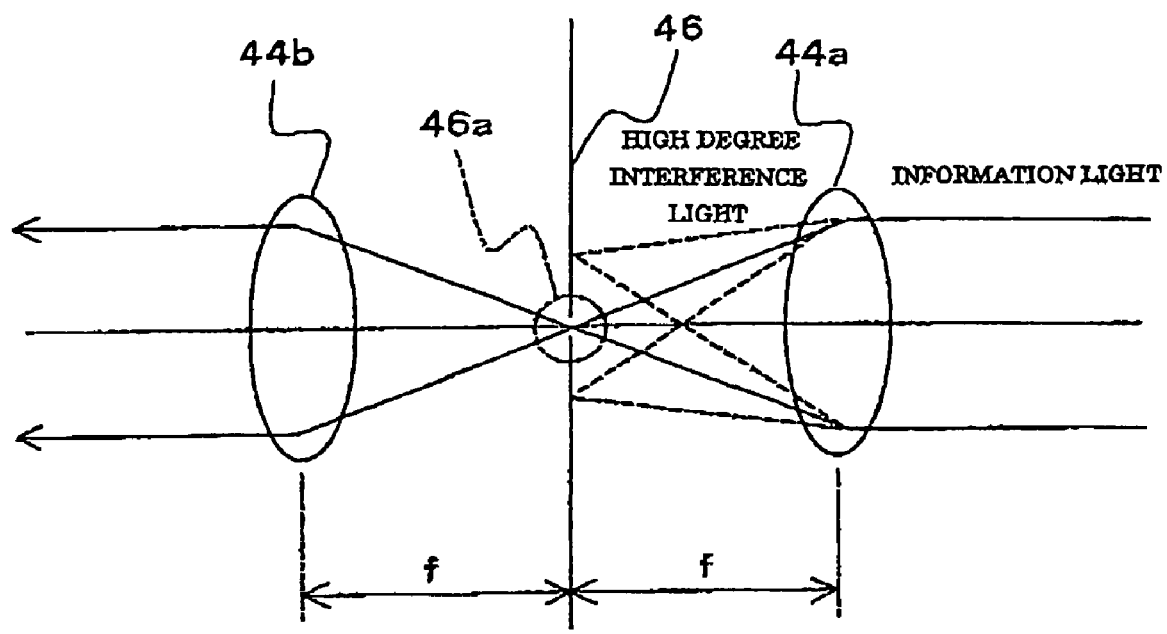
FIG. 7 is a drawing showing a construction of lenses 44a, 44b and a diaphragm 46.

FIG. 7 is a drawing showing a construction of lenses 44a, 44b and the diaphragm 46 corresponding to the diffracted light removal means. The distance f between the lens 44a and the diaphragm 46 is defined so that focal points of the diffracted light (information light), the reflected light of the spatial modulator 40 and the diffracted light whose proceeding direction corresponds with of the information light can be placed at the aperture 46a of the diaphragm 46. Therefore, as shown in FIG. 9, all information light from degrees L0 to L3 can pass the diaphragm 46. Regarding information light of degree L4, part thereof can pass at the corner parts of the aperture 46a, but the other parts thereof cannot pass the aperture 46a. Information light of degree L5 or higher is never able to pass the aperture 46a. Specifically, the information light incapable of passing the aperture 46a has no focal point inside the aperture 46a. Since the diaphragm 46 of the embodiment functions as above, unnecessary degree diffracted light can be removed by the lens 44a and the diaphragm 46.

Figure 10:
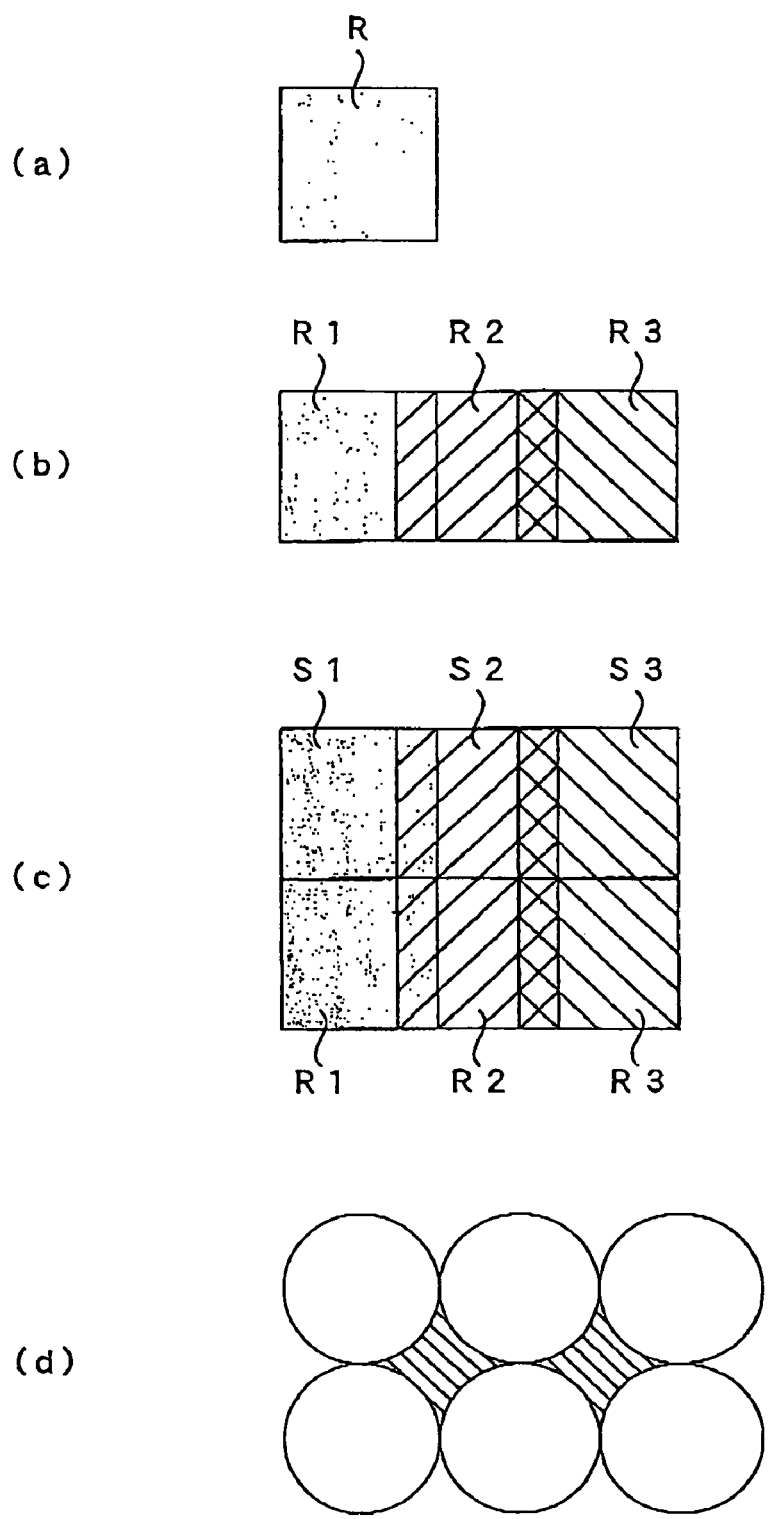
FIGS. 10a, 10b, 10c, and 10d are explanation drawings showing recording regions in an information recording medium.

Further, as shown in FIG. 10a, the information light which passed the aperture 46a of the diaphragm 46 as above is recorded in the information recording medium as a recording region R in the shape of approximately a square. Therefore, when recording regions are recorded as R1, R2, R3, S1, S2, and S3 by sequentially shifting the recording regions in the periphery direction and the diameter direction of the recording medium as shown in FIGS. 10b and 10c, there becomes no vacant space between adjacent recording regions, so that the recording regions in relation to the recording medium become efficient with no waste. In the case that recording regions are circular as shown in FIG. 10d, shaded areas become vacant spaces incapable of being recorded. Compared to this circular-shaped recording regions, it is evident that the recording density of the invention is very high.

Further, as shown in FIG. 9, compared to a circular aperture inscribed in the square aperture 46a (aperture having the same size as of the circle of L3), diffracted light having a large diffraction dimension (corresponding to L4) can be utilized as information light. Therefore, information recording in which utilization efficiency of the information light is maintained at a high level can be performed. In result, a recording density of information in a unit recording region can be significantly improved.

The construction and the operation of the invention have been described based on their principles and the embodiment. However, the invention is not limited to the foregoing embodiment, and various changes may be made without departing from the scope of the invention. For example, the invention can be similarly applied to an optical information recording/reproducing apparatus, wherein light paths of information recording and information reproduction are not separated from each other.

Due to the foregoing construction and the function of the invention, the shape of the recording region recorded in the optical information recording medium becomes approximately square. Therefore, when recording is performed by sequentially shifting each recording region, there becomes no vacant space between adjacent recording regions, so that the recording regions in relation to the recording medium become efficient with no waste. Further, compared to the circular aperture inscribed in the square aperture, the diffracted light having a large diffraction dimension can be utilized as information light. Therefore, information recording in which utilization efficiency of information light is maintained at a high level can be performed. In result, the recording density of the information can be significantly improved.

What is claimed is:

1. An optical information recording apparatus in which holography is formed in an optical information recording medium by making information light produced by a spatial modulator interfere with reference light, the apparatus comprising:

a light source;

a spatial modulator having a plurality of pixels for generating said information light by modulating irradiated light with each of said pixels;

a pair of lenses through which said information light and said reference light pass; and a diffracted light removal means arranged between said pair of lenses, which removes part of diffracted light from said spatial modulator, and having an aperture which is in the shape of a square provided on optical axes of said information light and said reference light; and an objective lens for irradiating said information light and said reference light onto said optical information recording medium; and wherein said pair of lenses is provided between said spatial modulator and said objective lens.

2. An optical information recording apparatus according to claim 1, said information light and said reference light have the same optical axis.

3. An optical information recording apparatus according to claim 1, wherein said diffracted light removal means is arranged by the focal position of said pair of lenses.

* * * * *